April 8, 1924.　　　　　　　　　　　　　　1,489,676
A. SMITH ET AL
AUTOMATIC WEIGHING MACHINE
Filed Dec. 1, 1922　　　9 Sheets-Sheet 4

Inventors:
A. Smith
C. Southall
A. B. Partridge
by Marker Clerk
Atty's

Inventors:
A. Smith
C. Southall
A. B. Partridge

Patented Apr. 8, 1924.

1,489,676

UNITED STATES PATENT OFFICE.

ARTHUR SMITH, CHRISTOPHER SOUTHALL, AND RALPH BERT PARTRIDGE, OF BIRMINGHAM, ENGLAND, ASSIGNORS TO SOUTHALL & SMITH LIMITED, OF BIRMINGHAM, ENGLAND.

AUTOMATIC WEIGHING MACHINE.

Application filed December 1, 1922. Serial No. 604,396.

*To all whom it may concern:*

Be it known that we, ARTHUR SMITH, CHRISTOPHER SOUTHALL, and RALPH BERT PARTRIDGE, British subjects, residing at Villa Street Works, Hockley, in the city of Birmingham, England, have invented certain new and useful Improvements Relating to Automatic Weighing Machines, of which the following is a specification.
This invention relates to automatic machines for weighing tea, powdered, granular and other like materials, and has for its object to construct an improved machine whereby rapid weighing can be obtained with a high degree of accuracy. The machine forming the subject of this invention is of the type in which the material is first approximately weighed in the upper of a pair of superimposed weigh pans each carried on its own weigh beam, the weighing being completed in the lower pan.

In the nine accompanying sheets of explanatory drawings:—

Figs. 1 and 1ª are elevational views which when considered together form a complete front elevation and Figs. 2 and 2ª when considered together form a rear elevation of a weighing machine constructed in accordance with this invention, a part of the case being broken away in each view to show the interior mechanism.

In carrying the invention into effect as shown there are mounted beneath a platform *a* a pair of superimposed weigh beams *b*, *c*. The beam *b* carries a pan *d* which at its lower end is fitted with hinged discharge doors *e*. The beam *c* carries a pan *f* and this also at its lower end is fitted with discharge doors *g*. The pan *d* delivers into *f*, and the latter discharges into the receptacles placed to receive the properly weighed quantities of material, such as tea.

Figure 5:
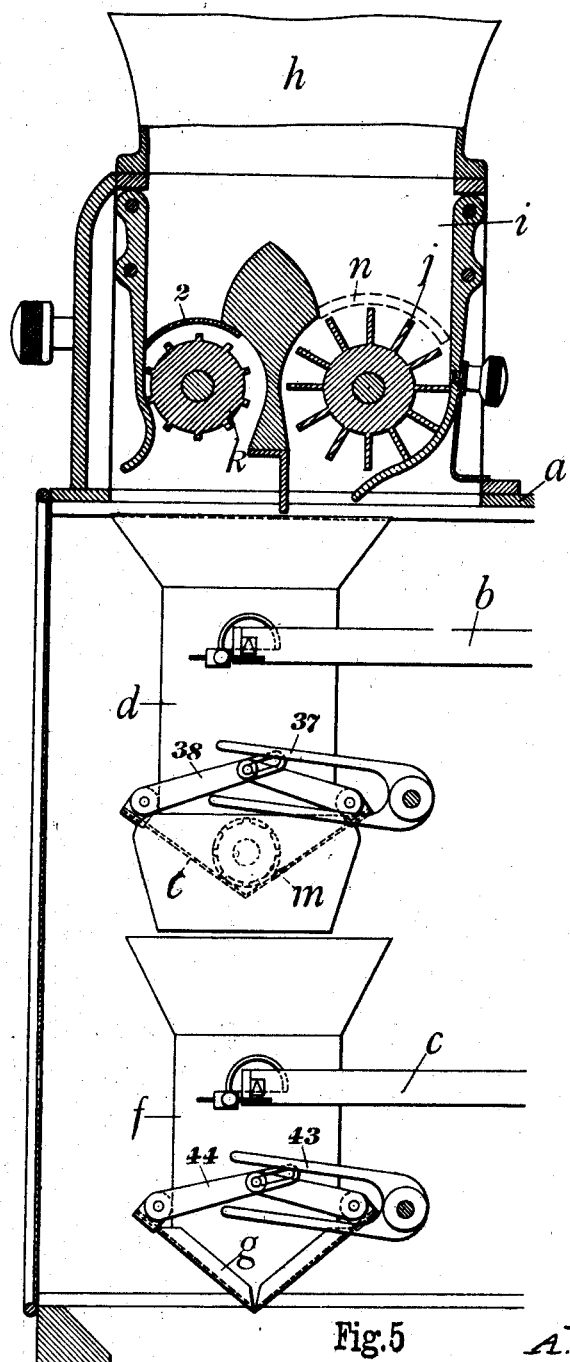
Figure 5 is a sectional elevation showing the mechanism for feeding the upper weigh pan, and Figure 6 a like view of the mechanism for feeding the lower pan.
Figure 6:
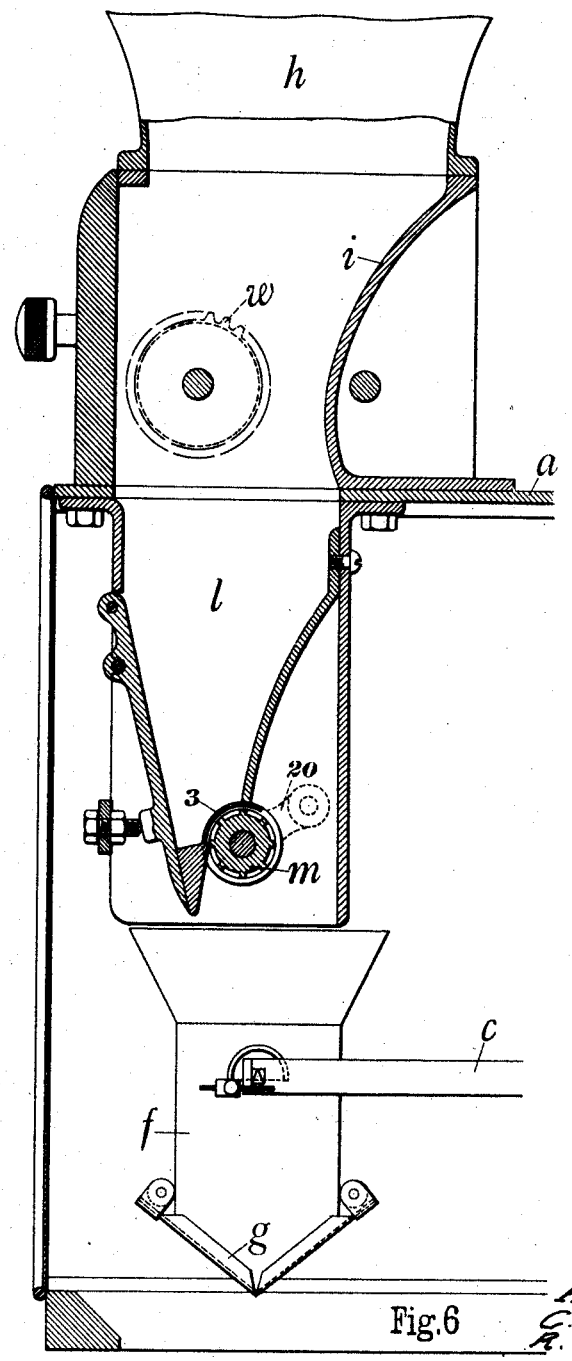

Above the platform is arranged a hopper *h* into which the material to be weighed is supplied, and between the hopper and the platform is a compartment *i* containing at one side a measuring device *j* and a dribble feeder *k* (Figure 5) both delivering into the upper pan *d*. Behind the parts *j* and *k* is a chute *l* fitted at its lower end with a dribble feeder *m* arranged to discharge directly into the lower pan *f* (Figure 6).

The measuring device *j*, which consists of a system of radial vanes as shown, or a rotatable cylinder having one or more pockets opening into its periphery, is operated once in each cycle of operations through a sufficient number of revolutions, or part of a revolution, to deliver from the hopper to the upper weigh pan *d* a predetermined quantity of material. This quantity may be varied or adjusted by a sliding shutter *n* arranged to cover more or less of the upper side of the measuring device, and is movable by hand through the medium of a screw *o* and nut *p*. Rotation of the measuring device is effected by gear wheels *q'*, sprocket *q*, chain *r* and sprocket *s*, the latter being formed with or secured to a sleeve *t* freely mounted on a driving spindle *u* and actuated as hereinafter described.

Figure 1:
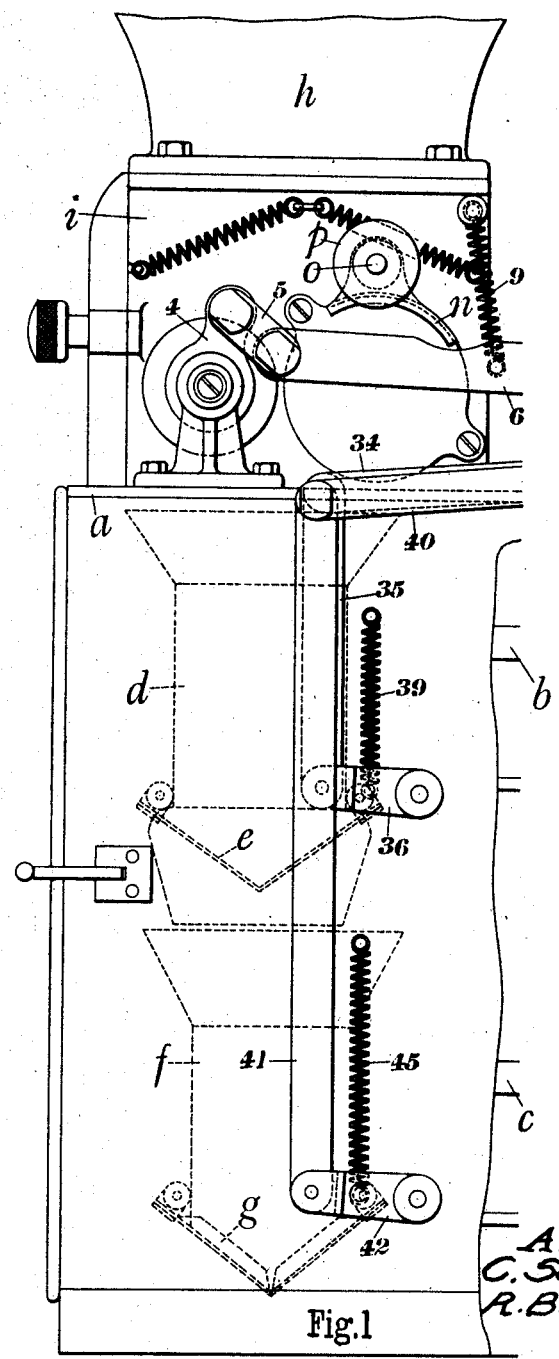
Figure 1A:
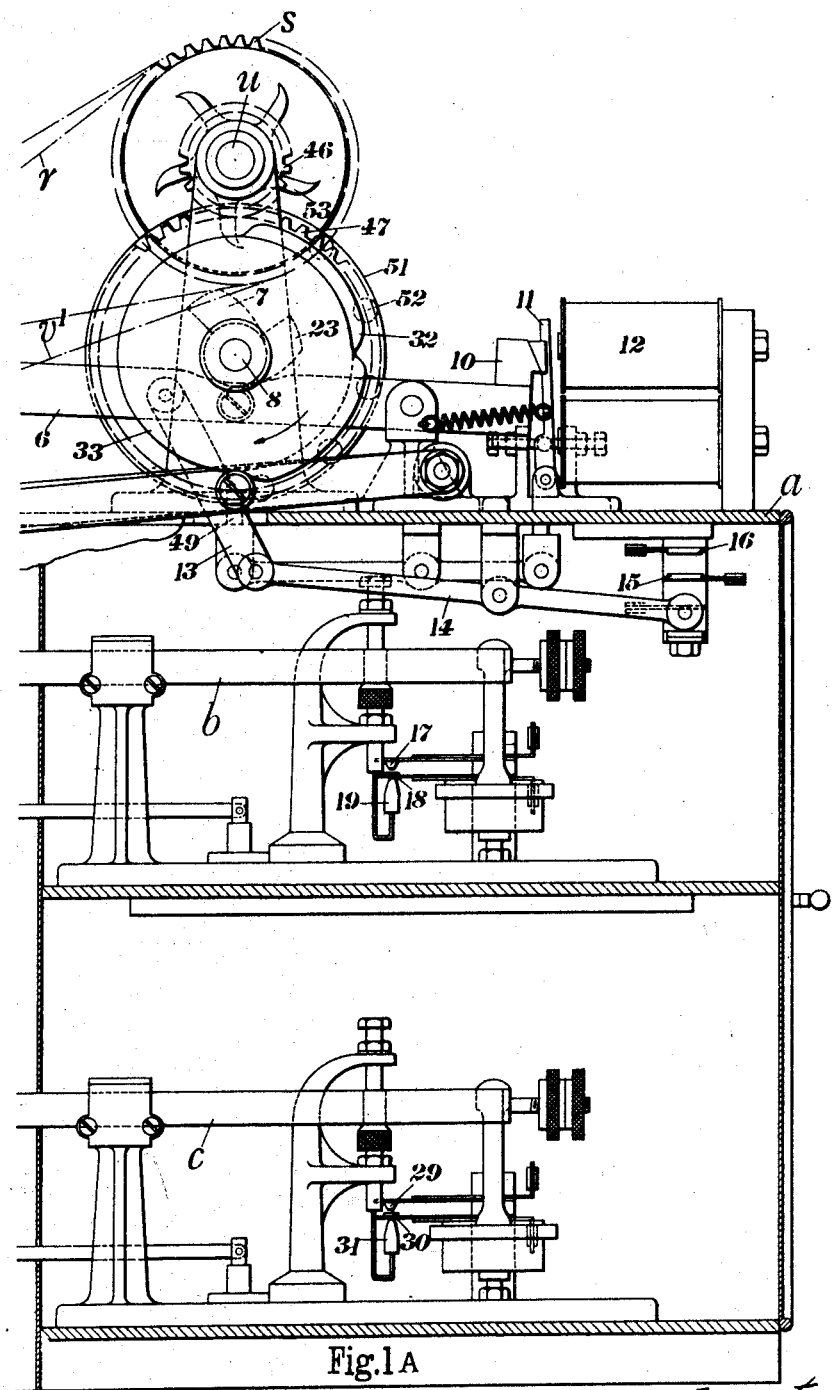

Both dribble feeders *k*, *m* are rotated continuously by a sprocket *v* on the spindle *u*, motion being transmitted to the feeder *k* by a chain *v'* and sprocket *w*, and to the feeder *m* by sprockets *x*, *y* and chain *z*. To control the flow of material to the feeder *k* an oscillatory shutter 2 is arranged over it as shown in Figure 5; the flow to the feeder *m* is likewise controlled by an oscillatory shutter 3. In Figures 5 and 6 both shutters are shown closed, and in that condition no material would pass. The shutter 2 is actuated by a lever 4, link 5 and lever 6 (Figure 1). The latter is moved in a direction for opening the shutter by a cam 7 on the shaft 8, and is closed by the action on the said lever of a spring 9. The shutter is held open for the required interval by the interaction of a catch 10 on the rear end of the lever and a spring controlled hinged armature 11, the latter being moved in the direction for releasing the lever by an electromagnet 12. Concurrently with this opening movement of the lever 6 the said lever also transmits motion through a link 13 to a lever 14 which presses a movable electric contact 15 into abutment with a stationary contact 16 in the magnet circuit. Before the magnet is energized it is necessary for the upper beam $b$ to close another switch consisting of a stationary contact 17 and a movable contact 18 which is actuated by a projection 19 on the beam.

Figure 2:
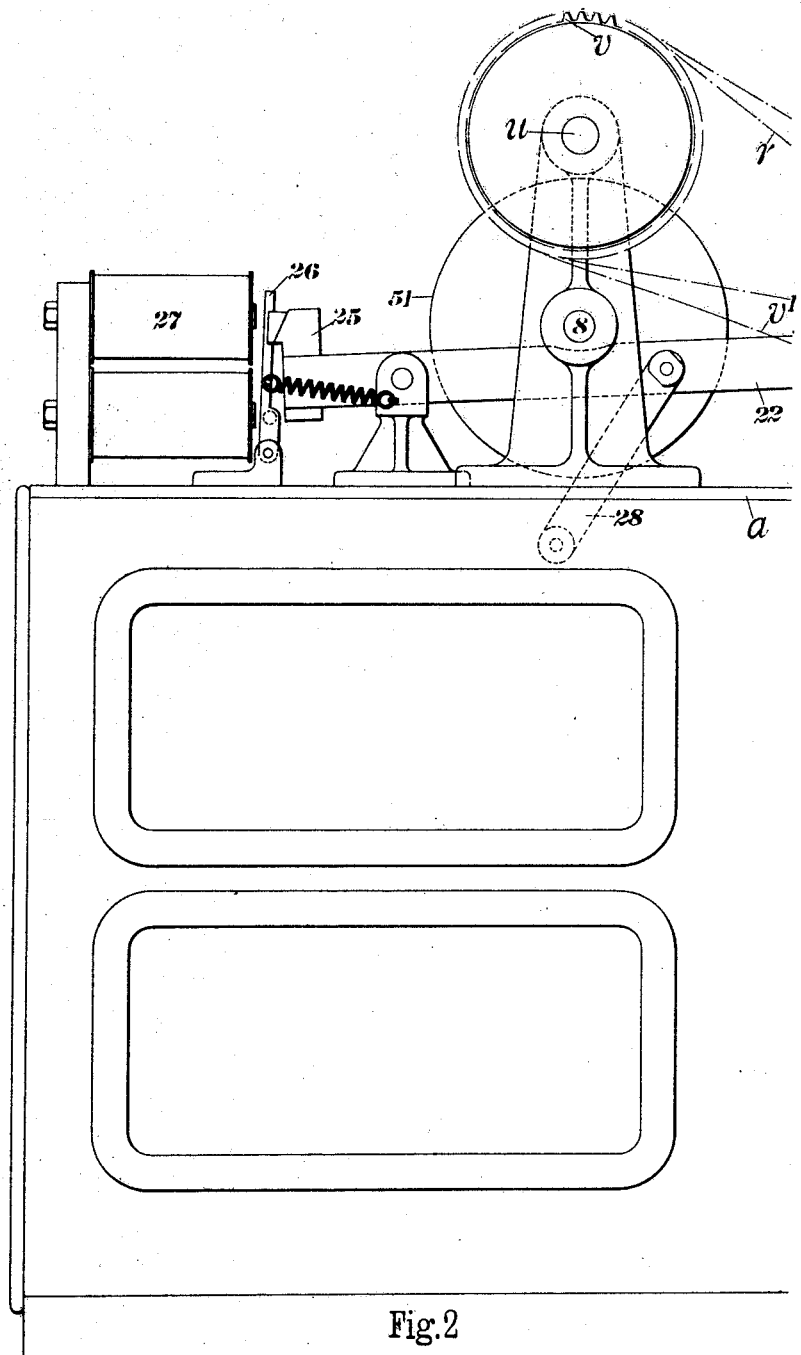
Figure 2A:
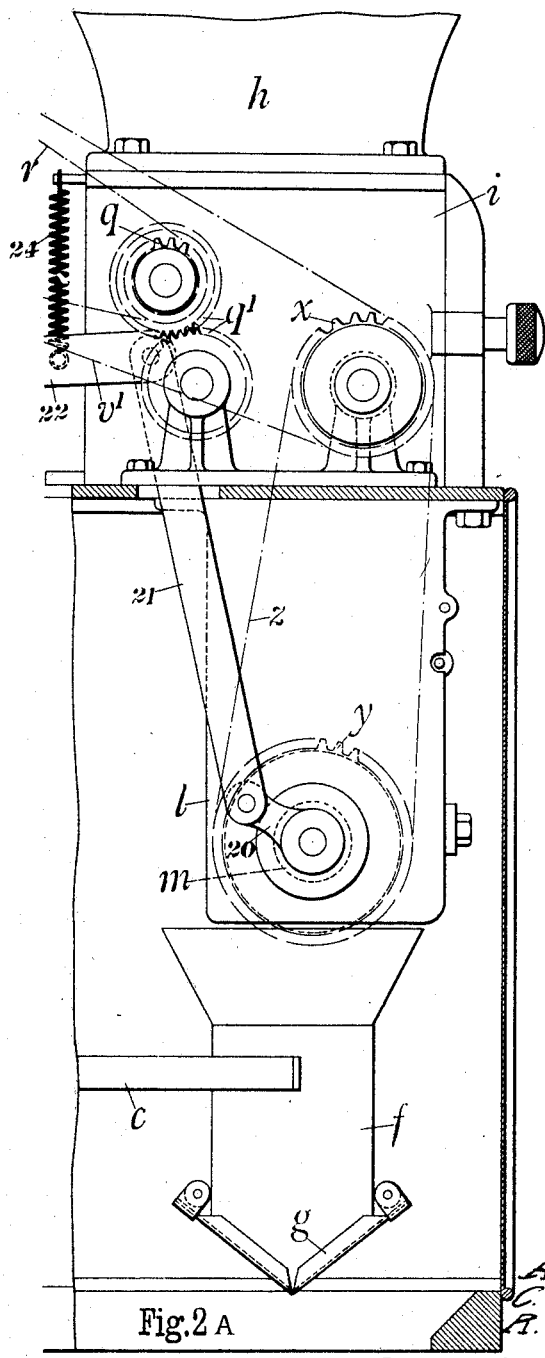
Figure 3:
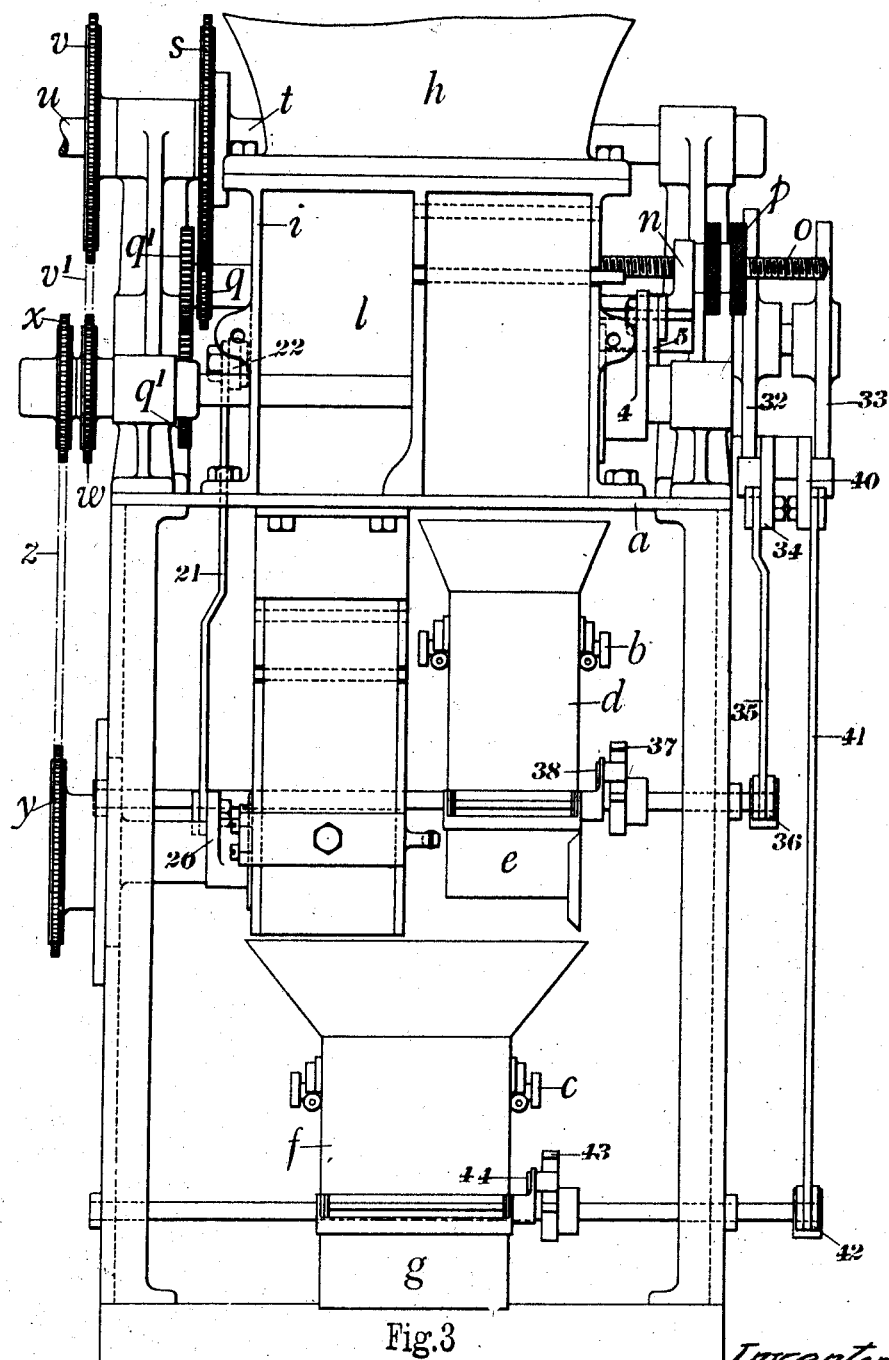
Figure 3 is an end elevation of the weigh pan end of the machine and Figure 4 is a plan of the machine.
Figure 4:
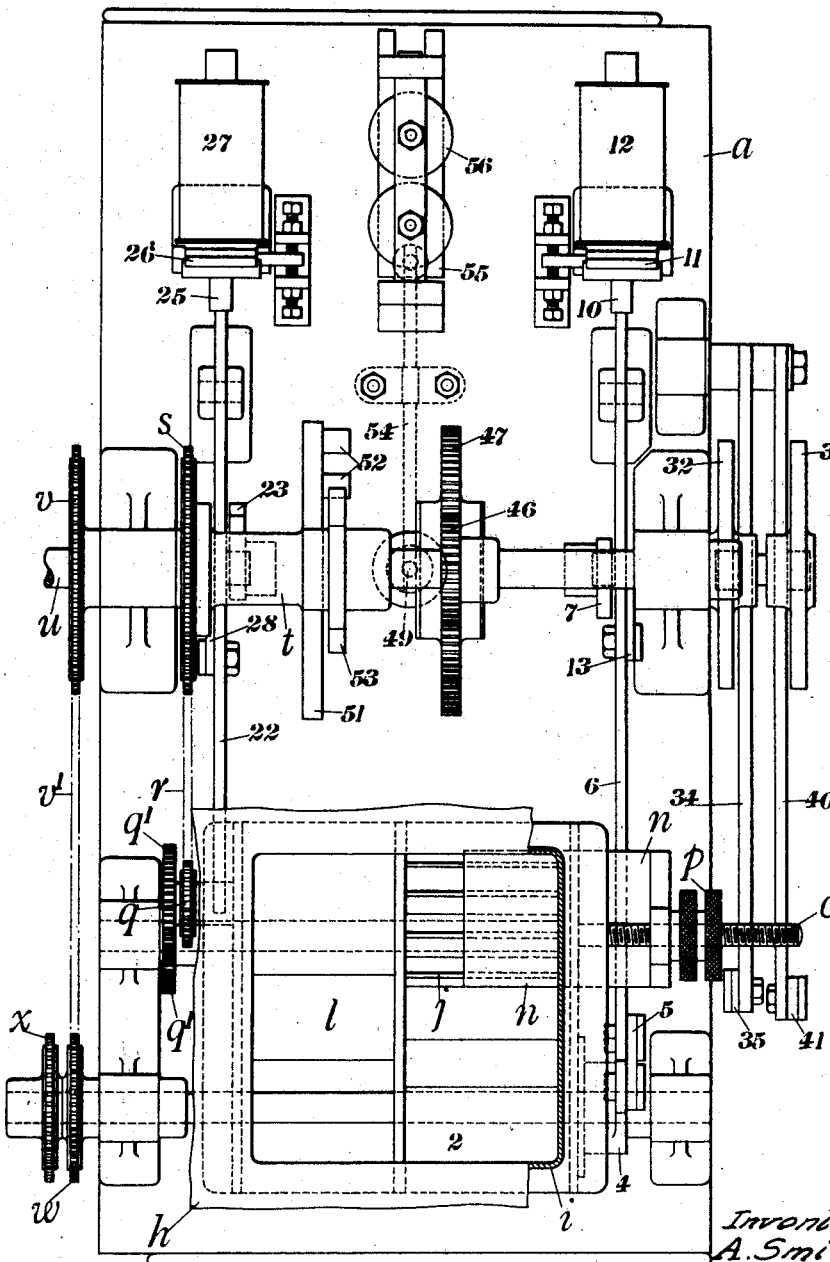

The shutter 3 is actuated by a lever 20, link 21 and lever 22 (Figure 2). The opening movement is imparted by a cam 23 on the shaft 8, and the closing movement by a spring 24. The shutter is held open by the interaction of a catch 25 and hinged spring controlled armature 26, the latter being released by an electromagnet 27. The lever 22 also operates through a link 28 a switch controlling lever and switch similar to that above described in conjunction with the magnet 12. The electromagnet 27 is under the control of a switch formed by a stationary contact 29 and movable contact 30 operated by a projection 31 on the lower beam $c$. A third electromagnet 56 controls the starting mechanism of the machine.

Opening of the hinged doors $e$, $g$, at the lower ends of the pans $d$, $f$ is effected from a pair of cams 32, 33 on the shaft 8. The cam 32 acts on a lever 34, and the motion is transmitted through a link 35 to a lever 36 which is secured to a forked lever 37 arranged to operate on toggles 38 connected with the doors $e$ (Figure 5). Closing of the doors after the operation of the cam is effected by a spring 39. Likewise the doors $g$ are operated from the cam 33, through a lever 40, link 41, lever 42 and forked lever 43 acting on the toggles 44, the closing being effected by a spring 45.

Figure 8:
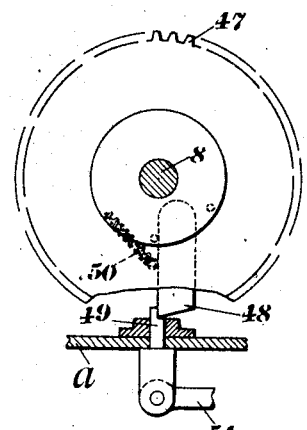

The motion of the different mechanisms is derived from the continuously rotating shaft $u$. This is provided with a gear wheel 46 engaging a gear wheel 47 freely rotatable on the shaft 8. In conjunction with the wheel 47 is provided any ordinary form of clutch whereby the said wheel can be temporarily connected to the shaft 8. The clutch is actuated by a lever 48 (Figure 8) which moves round with the clutch. When the lever is arrested by its engagement with a movable stop 49 on the platform $a$ it releases the clutch. On withdrawal of the stop the lever is moved by a spring 50 into position for engaging the clutch and putting the shaft 8 in motion. During its rotation the said shaft revolves the aforesaid cams 7, 23, 32, 33 and also a disc 51 provided with lateral pegs 52 which engage a star wheel 53 on the sleeve $t$, the motion of the latter serving to operate the measuring device $j$ above described. The pegs 52 subtend only a suitable portion of the disc 51, usually about one half, so that motion is imparted to the star wheel during only a part of the rotation of the disc, that motion being appropriately timed in relation to the operations of the aforesaid cams on the shaft 8. In each cycle of operations the shaft 8 performs one revolution.

Figure 7:
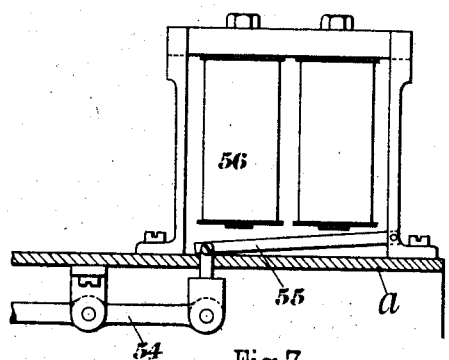
Figures 7 and 8 are side elevations illustrating the main clutch controlling mechanism, the electromagnet acting on one end of the clutch releasing lever being shown at Figure 7, and the clutch releasing device at the other end of the lever being shown at Figure 8.

The stop 49 is actuated by a lever 54 (Figures 7, 8) from the hinged armature 55 of the electromagnet 56.

To follow the cycle of operations it is best to start with the upper pan full, and the weighing in the lower pan approaching completion. The dribble flow into the lower pan through the feeder $m$ continues until the weigh beam tilts. This action of the beam closes the switch 30 and thereby causes the excitation of both the magnets 27 and 56. The effect of the magnet 27 is to release the lever 22 and allow the shutter 3 to be closed by the spring 24. The supply to the lower hopper then ceases. The effect of the magnet 56 is to withdraw the stop 49 from the clutch lever 48, and allow the clutch to come into action, thereby setting the shaft 8 in motion. During the following single revolution of the said shaft each of the above described parts actuated by the same is brought into operation. The first action is that of the cam 33 which depresses the lever 40 and opens the doors $g$ of the lower pan, allowing the contents of that pan to be discharged. As soon as the lever 40 is released the doors are closed by the spring 45. Immediately after the cam 32 comes into action and opens the doors $e$ of the upper pan, allowing the contents of that pan to fall into the lower pan. At proper intervals the cams 7 and 23 also come into action causing the shutters 2 and 3 of the dribble feeds to open. Also the disc 51 imparts, through the star wheel 53 the required motion to the measuring device $j$. At the end of this motion the clutch is disengaged by the stop 49, and the shaft 8 remains at rest until the next weighing has been completed. After the measuring device has delivered the predetermined quantity of material to the upper pan, the dribble feed $k$ continues the supply until the upper beam $b$ is tilted. The switch 18 is then closed and the magnet 12 caused to release the lever 6 and allow the shutter 2 to be closed by the spring 9. Meanwhile material is flowing through the dribble feeder $m$ to the lower pan to make up to the proper weight the material previously delivered by the upper pan. At the completion of this operation the lower beam $c$ tilts, causing the switch 30 to be closed, and above described cycle of operations is then repeated.

By this invention we are able to obtain the desired high speed of working and accurate weighing with mechanisms which are relatively simple and robust.

Having thus described our invention what we claim as new and desire to secure by Letters Patent is:

1. In an automatic weighing machine, the combination with a weigh beam and a pan carried on the beam, of a continuously rotating feeding device for delivering material to the weigh pan, and a shutter under the control of the beam for preventing access of material to the feeding device, substantially as described.

2. In an automatic weighing machine, the combination with a weigh beam and a weigh pan carried on the beam, of an intermittently rotated feeding device for delivering a bulk of material to the weigh pan, a continuously rotating feeding device for delivering a relatively small quantity of material to the pan, and a shutter under the control of the beam for preventing access of material to the second named feeding device, substantially as described.

3. In an automatic weighing machine having the features claimed in claim 2, the combination with the intermittently rotated feeding device, of a slide for regulating the quantity of material admitted to the said device, substantially as described.

4. In an automatic weighing machine, the combination with a pair or superimposed weigh beams and a weigh pan on each beam, the pan on the upper beam being arranged to discharge into the pan on the lower beam, of an intermittently rotated feeding device, and a continuously rotating feeding device with shutter under the control of the upper beam for supplying material to the upper pan, and a continuously rotating feeding device with shutter under the control of the lower beam for supplying material to the lower pan, substantially as described.

5. In an automatic weighing machine as claimed in claim 4, the combination comprising mechanically operated means for opening and retaining the shutters of the continuously rotating feeding devices, electromagnetic means under the control of the weigh beams for releasing the shutters, and springs for closing the shutters, substantially as described.

6. In an automatic weighing machine, as claimed in claim 4, the combination comprising a hinged door or doors beneath each weigh pan, a rotatable shaft, cams on said shaft, means for transmitting opening movements from the cams to the weigh pan doors and to the shutters of the continuously rotating feeding devices, springs for closing the door and the shutters, electromagnetic means under the control of the beams for controlling the rotation of the shaft and for releasing said shutters, and means for transmitting motion from said shaft to the intermittently rotated feeding device of the upper pan, substantially as described.

In testimony whereof we have signed our names to this specification.

ARTHUR SMITH.
CHRISTOPHER SOUTHALL.
RALPH BERT PARTRIDGE.